United States Patent [19]

Siegle et al.

[11] 4,079,419
[45] Mar. 14, 1978

[54] METHOD AND APPARATUS FOR TRANSMITTING AND RECEIVING ADDITIONAL INFORMATION IN A TELEVISION SIGNAL

[75] Inventors: Gert Siegle, Hildesheim; Albrecht Altmenn, Sibbesse, both of Germany

[73] Assignee: Blaupunkt-Werke GmbH, Hildesheim, Germany

[21] Appl. No.: 626,854

[22] Filed: Oct. 29, 1975

[30] Foreign Application Priority Data

Nov. 5, 1974 Germany .............................. 2454227

[51] Int. Cl.² ........................ H04N 5/44; H04N 7/04; H04N 7/16
[52] U.S. Cl. .................................. 358/193; 358/191; 358/194; 358/143; 358/188; 358/117
[58] Field of Search ............. 178/5.6, 5.8 R, DIG. 23; 358/188, 191, 192, 142, 143, 145, 190, 193, 194, 117

[56] References Cited

U.S. PATENT DOCUMENTS

| 3,493,674 | 2/1970 | Houghton | 178/5.6 |
| 3,632,863 | 1/1972 | Hirashima | 178/5.6 |
| 3,903,472 | 9/1975 | Wahl | 325/392 |
| 3,927,250 | 12/1975 | Rainger | 178/5.6 |

OTHER PUBLICATIONS

"Television Information Systems," *Wireless World*, Dec. 1973, p. 588.
"TV Information Service," *Wireless World*, May 1973, p. 222.

*Primary Examiner*—John C. Martin
*Attorney, Agent, or Firm*—Flynn & Frishauf

[57] ABSTRACT

Identification of a program being transmitted is encoded digitally on a sub-carrier modulated on the sound carrier of a television signal with each elementary code group occupying a television field interval, the information being transmitted in cycles of several television fields. The sub-carrier frequency is chosen so as to minimize interference with the picture or sound.

A receiver is programmed to be in a standby state during a period during which the coded identification of desired programs are compared with detected program identifications. The receiver is shifted from channel to channel so long as the program desired for the particular time is not found. When it is found, the display circuits are turned on and the channel-shifting device is disabled, so long as the identification of the desired program continues to be detected.

6 Claims, 9 Drawing Figures

METHOD AND APPARATUS FOR TRANSMITTING AND RECEIVING ADDITIONAL INFORMATION IN A TELEVISION SIGNAL

The present invention relates to a method for transmitting additional information in a television signal, and more particularly for transmitting code signals identifying the station, the channel, the program, the date, and the time.

The transmission of such information serves for considerably enlarging the service capabilities of a television receiver and the information it can usefully handle. Thus, by transmission of a station identifying signal, it is possible to preselect a station at the television receiver, which station will automatically be tuned by means of an automatic station searching device provided in the television receiver. Likewise, the transmission of a channel identifying signal can be used for tuning a preselected channel. The transmission of a program identifying signal can, likewise, serve for directly dialling a program which has been provided with an identifying number or code beforehand. In case a date or time identifying signal is transmitted, the television set user may program a date and a time in advance.

Upon reception of one identifying signal or a plurality thereof, the receiver accomplishes a switching process by means of which it may, for example, switch over from a stand-by operation to full operation or from another station to the preselected one.

It has been suggested to transmit further information which can be called up in the form of displayed pictures (selectible fade-ins in the form of text for deaf persons or in foreign languages, news lines, distress calls, or the like) or which can be processed in the receiver itself.

A known method for transmitting such data is based on the fact that during television transmission, some scanning lines are blanked during vertical flyback, which means that they do not appear on the picture tube. Those scanning lines are, pursuant to international and national agreements, to a high degree preempted for test signals. In the individual countries, 2 to 4 scanning lines are kept free for insertion of information so that a so-called data line can be formed.

In the known practice, this data line is taken up for digital coded information. To decode the information contained in the data line, a decoder is required in the receiver. These decoders have turned out to be expensive, considerably increasing the cost of a television receiver.

It is, accordingly, the object of the present invention to develop a new method for the transmission of additional information, which will require less complex and expensive decoders.

SUMMARY OF THE INVENTION

Briefly, the information is transmitted in coded form at predetermined intervals by means of one or a plurality of subcarriers which, after the demodulation has been accomplished, lie above the range of audibility, the subcarriers being modulated upon the sound carrier, and the beginning of a transmission interval correlates with the beginning of a field.

The main advantages achieved by the present invention consist in that, contrary to the methods based on the data line, a continuous flow of information is guaranteed so that the cost for recognition circuits are saved, and that, due to the lower data rate per unit of time, greater safety from interference is achieved. The correlation of the beginning of the data transmission cycles with the beginning of fields offers the advantage that signals present in the usual television signals may very easily be utilized for switching processes.

As a data transmission cycle may extend over several fields, the transmittable information rate is not limited. It has proved to be advantageous with regard to the safety from interference and to the reliability of detection if only one code group is transmitted per field.

For the purpose of the indentification of a station, channel, program, and time, as well as of additional information, a data transmission extending over three fields is found particularly advantageous. In case of transmission of a mass of data, it appears advisable to utilize a binary digital code for the data transmission, which means that a coded bit pattern is modulated upon a subcarrier. In another method, the coding is accomplished by radiation of different frequency sequences, the frequencies being unmodulated subcarriers lying in a frequency series which will preferably lie between the double and the quadruple line frequency.

In the simpler form of transmission, a pulse sequence generator produces a sequence of counting pulses beginning after the lapse of a predetermined delay following generation of a television field start pulse and a plurality of counting circuits are arranged to receive sequences of counting pulses from the pulse sequence generator. A plurality of encoding means connected respectively to the counting circuits determine the end of the count timing for each of the counting circuits and logic circuits responsive to television field start pulses and to the end of count timing outputs of the counting circuits and to the output of the pulse sequence generator produce, as an output, a train of pulses corresponding in number to the output of one of the encoding means during one television field interval and a train of pulses corresponding to an output of another of the encoding means during the next television field interval and so on until pulse trains corresponding to the output of each encoding means have been produced, this in a repeating cycle. In the corresponding receiver, rectifying and decoding means following a narrow band filter tuned to the subcarrier frequency produce trains of pulses from the modulation of the subcarrier waves received, a recognition signal start pulse corresponding in time to a television field start pulse being separately detected. The pulse trains produced by the decoding means in each television field are compared with a pre-stored partial digital signal. A field counter may switch the pulses to separate decoders for each field in the field sequence, the output of each decoder being compared with a different partial program signal, or a single decoder may be switched to compare each field sequence of pulses in different comparators, in which case either the several comparison results can be stored and combined or the finding of a match in a first comparison can connect the decoder with a second comparator for a second comparison, and so on, a match in the last comparison in that case indicating a successful match in all fields of the cycle. In the latter case, the early stages of comparison can each be disabled as the next one is enabled. A successful overall comparison is then in each case, typically used to switch the television receiver from a standby state to a receiving state, to turn on a display of the channel being received and to disable a station search device operable in the standby state to move from channel to channel searching for a program for which the subcarrier information will match that provided by an internal programming unit in the receiver as programmed for the particular listening time.

The invention is further described by way of example with reference to the accompanying drawings, in which:

FIG. 9 is a block diagram illustrating still another form of modification of the circuit of FIG. 5 for receiving information transmitted over a cycle of a plurality of television field intervals.

Figure 1:
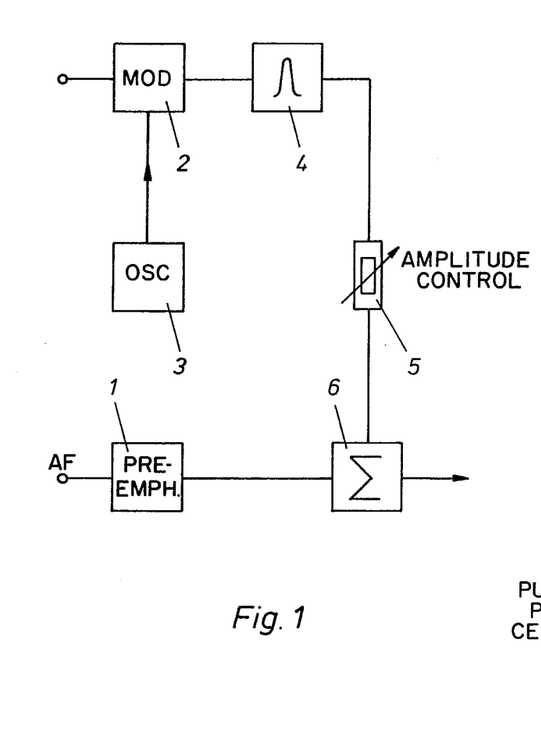
FIG. 1 is a basic block diagram of a transmitter circuit radiating additional information in the sound signal.

The basic circuit diagram illustrated in FIG. 1 shows a normal portion of a sound transmitter in which the audio-frequency sound signal (AF) is applied to a known pre-emphasis stage 1, in which the higher audio frequencies are pre-emphasized for the purpose of noise reduction. The signal thus processed is supplied to the sound transmitter (not shown), where it is modulated upon a carrier frequency.

To transmit additional information, a digital coded identifying signal $U_{Kenn}$ is modulated in a modulator 2 upon a subcarrier which is generated in a subcarrier oscillator 3 and which preferably is an integral multiple of half the line frequency, so that harmonics of the subcarrier do not produce an interfering effect. The modulated subcarrier arrives through a band-pass filter 4, tuned to the subcarrier, and through a control element 5 to a summation stage 6, where the modulated subcarrier is added to the normal AF-signal. This composite signal is then modulated upon the sound carrier in the conventional manner.

The identifying signal may contain some digital coded information in any known code, e.g. in a normal bcd-code or in a so-called bi-phase-code which assures greater immunity to interference.

Figure 2:
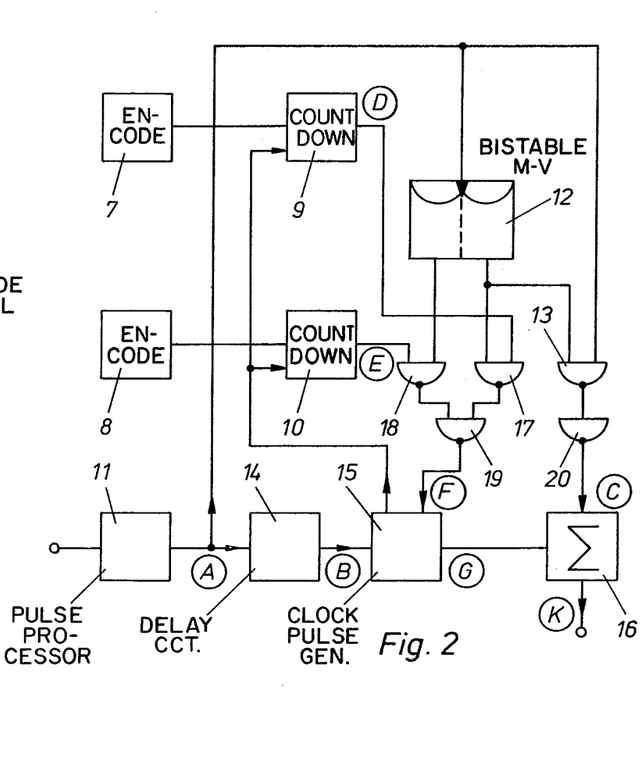
FIG. 2 is a basic block diagram of a circuit suitable for building up an identifying signal.

For the transmission of the above-mentioned identifying signals and additional information, it is advantageous to express the information in terms of the number of pulses per a predetermined unit of time, the pulses in such unit of time constituting, therefore, an elementary code group of the information. Of course, it is also possible to send pulses in a permutation code within each predetermined unit of time if a greater information rate is desired, at some cost of circuit complexity. A simple circuit therefor is shown in FIG. 2 and the voltage variations therein are shown in the timing diagram given in FIG. 3.

The circuit is designed so as to transmit the data in two elementary code groups respectively during two fields. The number of pulses during each field characterizes some information. The number of pulses in the first field is applied to a first coding 7 and the number of pulses in the second field to a coding stage 8.

The first coding stage 7 sets a first count-down counter 9 to the chosen number for the first field (in the example "6"), the second coding stage sets a second countdown counter 10 to the number for the second field (in the example "4"). A pulse processing stage 11 is connected to one input of the circuit. To this input the field pulses of the television signal are connected, which field pulses are pre-amplified and converted into rectangular pulses. The shaped field pulses (line A of FIG. 3), present at the output of the pulse processing stage 11 (point A), arrive at a bistable multivibrator 12, which is switched over in the rhythm of the field pulses, and reach a first input of a first NAND-gate 13 and a delay circuit 14. The delay circuit 14 may utilize a triggered monostable flipflop circuit, or a delay line, or any other well-known delay circuit configuration. The delayed field pulse (in point B of the circuit; illustrated in line B of FIG. 3) starts a clock generator 15 which sends positive pulses to the step-down counters 9, 10 at a frequency of 1 kHz, and controls the counting run. Simultaneously, the output pulses of the clock generator (line G in FIG. 3) appear at a first input of a summing circuit 16.

At the outputs of the count-down counters 9, 10 (points D and E of the circuit), positive d.c. voltages are present which are interrupted by a negative pulse, when the counting process has been finished, i.e. when the digit "0" is reached. The output of the first count-down counter is connected to a first input of a second NAND-gate 17, the second input of which is connected to a first output of the bistable multivibrator 12. The output of the second count-down counter 10 is connected to a first input of the third NAND-gate 18 and a second output of the bistable multivibrator 12 to a second input of said NAND-gate 18. The outputs of the second NAND-gate 17 and the third NAND-gate 18 are connected to the two inputs of a fourth NAND-gate 19. The output of the fourth NAND-gate 19 (point F) controls the stop-input of the clock generator 15.

There is another connection from the first output of the bistable multivibrator 12 to a second input of the first NAND-gate 13. The output signal of the first NAND-gate 13 arrives at a second input (point C) of the summing circuit 16 via an inverter 20.

At the output of the summing circuit 16 (point K), the identifying signal $U_{Kenn}$ is present, which is subsequently processed in the circuit according to FIG. 1. The mode of operation of the circuit illustrated in FIG. 2 will be explained with the aid of FIG. 3.

Figures 3, 4:
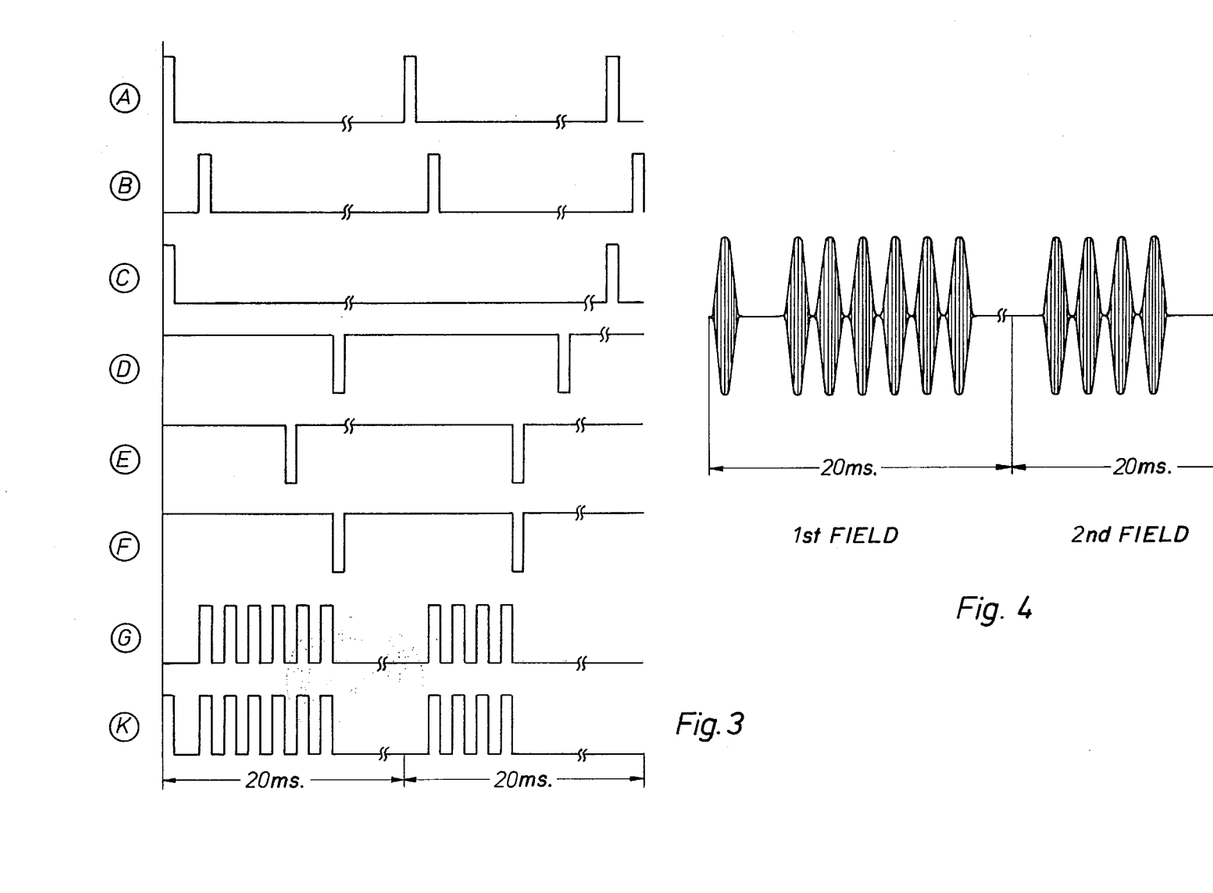
FIG. 3 is a timing diagram showing the voltage variations, as a function of time, at different points of the circuit illustrated in FIG. 2.
FIG. 4 is a wave-form diagram illustrating a radiated identifying signal.

The shaped field pulses (line A) switch the bistable multivibrator 12 over. At the beginning of the data transmission, the bistable multivibrator 12 is controlled so that a positive signal lies at the first output. That is why the first NAND-gate 13 is opened for the field pulse, and develops at its output a negative pulse which is converted to a positive pulse by the inverter 20. The positive pulse arrives at the input of the summing circuit 16, and, consequently, appears in the identifying signal $U_{Kenn}$ as an equivalent of the field pulse. The clock generator 15 controls the counting run of the count-down counters 9 and 10. As in the illustrated example, the second count-down counter 10 is set with the digit "4" and the first count-down counter 9 with the digit "6", the second count-down counter 10 is the first to finish its counting run, and delivers a negative pulse, the so-called "Borrow"-pulse. Before this pulse arrives at the output of the third NAND-gate 18, there is a logic "1" signal, as the logic "0" signal is fed from the second output of the bistable multivibrator 12 to the second input and from the first count-down counter to the first input.

The signal "0" is present at the output of the second NAND-gate 17, as the signals "1" are delivered from the first output of the bistable multivibrator 12 and from the first count-down counter 9. Consequently, at the output of the fourth NAND-gate 19, the signal "1" develops. When the "Borrow"-pulse of the second count-down counter appears at the first input of the third NAND-gate 18, the output signal will not change, as the signal "1" present at the second input determines the output signal "0" independently of the signal present at the first input. After the counting run of the first counter 9 has been finished, the signal "0" abruptly appears at the first input of the second NAND-gate 17, so that the output signal instantaneously changes to "1". Thereupon, the signal "1" will lie at both inputs of the fourth NAND-gate 19 for the duration of one pulse. Consequently, a negative pulse appears at the output, said negative pulse stopping the clock generator 15.

The pulse frequency and a suitable number range for the pulses are chosen so that the counting run of the count-down counters 9 and 10 has definitely terminated when a new field pulse arrives at the input of the circuit. The new field pulses switches the bistable multivibrator 12 over, so that the signal "0" is then present at the first output and the signal "1" at the second. Hence, it follows that the field pulse does not cause any change at the output of the first NAND-gate 13, i.e. it does not arrive at the summing stage 16 (see line C). The clock generator 15 is restarted by the delayed field pulse, and again controls the count-down counters 9 and 10, which are set anew. Thereupon, a process analogous to that for the first field is executed, but with the difference that, due to the switched-over bistable multivibrator 12, the "Borrow"-pulse of the first step-down counter 9 is ineffective, whereas the "Borrow"-pulse of the second counter 10 stops the clock generator.

According to the fact just mentioned, the identifying signal $U_{Kenn}$ (line K) consists of the first field pulse and six pulses in the first field and four pulses in the second field. The next field resets the multivibrator 12, which means that one data transmission cycle is terminated and that the data transmission will restart. After they have been modulated with the subcarrier and have passed through the band-pass filter 4, the pulses show the configuration of a bell, as is illustrated in FIG. 4, in order not to transmit the high-frequency signal content of rectangular pulses, which content might cause interference in the receiver.

Preferably, the pulses have a width of 0.5 millisecond at 50% down. The deviation of the sound carrier caused by the subcarrier should lie between ± 3 kHz and ± 5 kHz, in order to assure satisfactory freedom from interference on one hand and to fulfill the compatibility requirements on the other hand, i.e. not to impair the sound reception in older receivers. There are many cases in which the clock generator 15 may conveniently be constituted by a frequency divider which divides the line frequency.

It will be apparent to those skilled in the art that the circuit may easily be expanded in order to transmit data information extending over three or more fields.

In most cases, sufficient information will be transmitted when a data transmission cycle of three fields is chosen.

Figure 5:
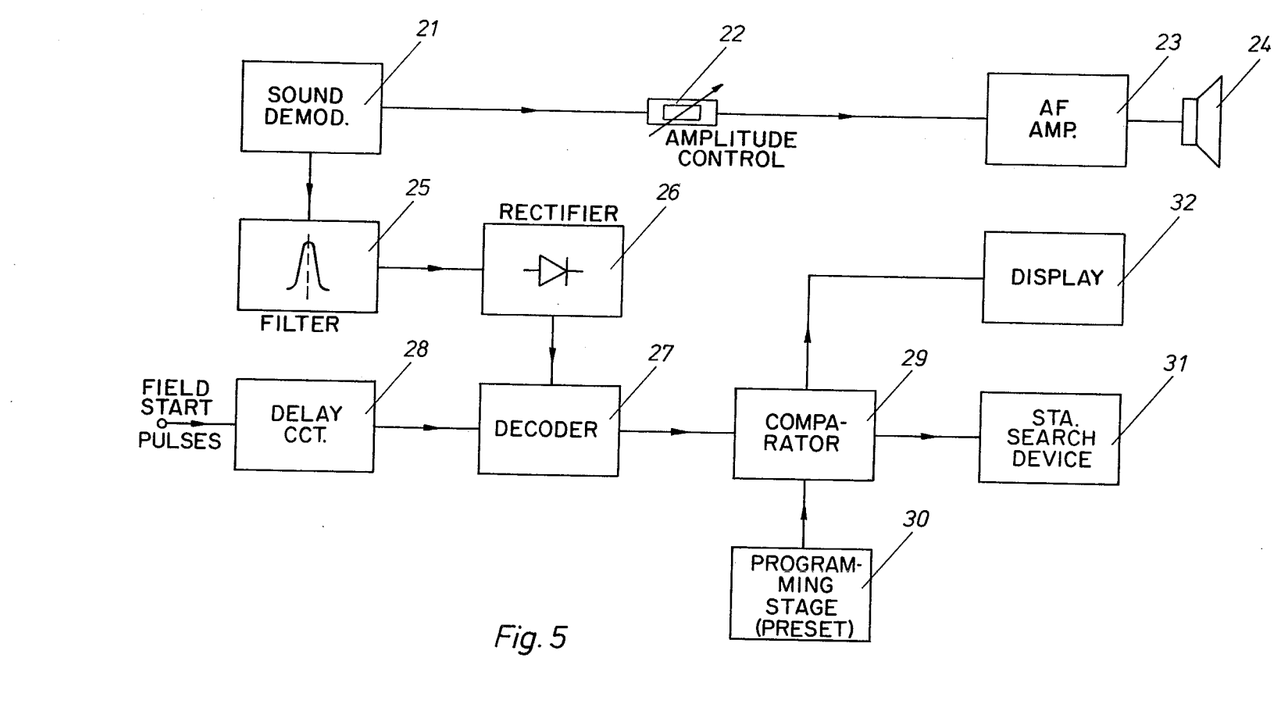
FIG. 5 is a basic block diagram of a circuit suitable for decoding the received additional information.

FIG. 5 shows the basic block diagram of a receiver circuit. An AF-stage 23 is connected through a control element 22 to a sound demodulator 21, a loudspeaker 24 being connected to the AF-stage 23.

A signal is taken from a second output of the sound demodulator 21, which signal is independent of the control element 22, and is fed to a filter 25 tuned to the subcarrier. The subcarrier thus filtered out arrives at a decoder 27 via a rectifier 26. The decoder 27 is synchronized by a field pulse delayed in a delay stage 28. The received digital identifying signal $U_{Kenn}$, which is liberated from the field pulse, is present at the output of the decoder 27, and is applied to the comparing stage 29, in which the received identifying signal $U_{Kenn}$ is compared with a signal preselected in a programming stage 30 of the receiver. Upon equality of the two signals, an automatic station searching device 31 is stopped and the received station is indicated by means of a display 32. If it is desired that the television receiver should turn itself on automatically in response to the received identifying signals, some parts of the receiver have to operate when the receiver is idle. Such a so-called stand-by condition is already known from receivers with ultrasonic remote control, and is utilized to a great extent.

Figure 7:
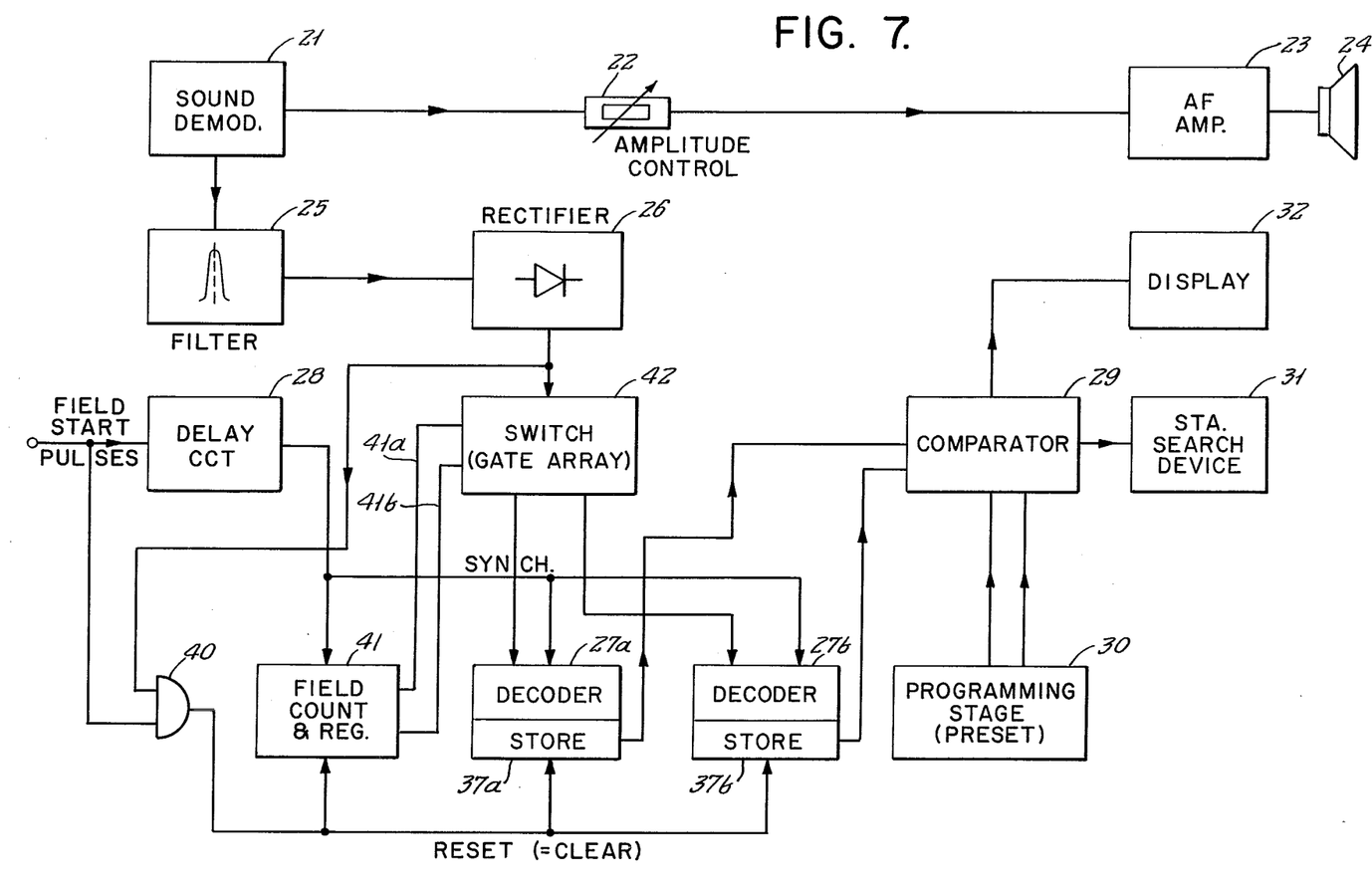
FIG. 7 is a block diagram of a modification of the circuit of FIG. 5 for receiving information in a cycle of a plurality of television field intervals.

As regards the method described in the present disclosure, it is advantageous if the automatic station searching device 31 is continuously running during the stand-by condition. In this case, the automatic station searching device 31 is then, for example, stopped in response to the equality of a received and a preselected time or program identifying signal. The above-described mode of operation of the automatic station searching device 31 offers the advantage that a temporary turning off of the desired television transmitter has no influence on programming the receiver for a later time. The comparison of the received identifying signal $U_{Kenn}$ with the preselected signal may be accomplished by counting the pulses per field in the receiver, and storing them. Then the complete identifying signals may be compared to each other, as illustrated in FIG. 7. As in the present example, the identifying signal $U_{Kenn}$ extends over two fields, and there must be a switching over from a counter 27a decoding the first partial signal and provided with a store 37a, to a counter 27b decoding the second partial signal and provided with a store 37b as well. This may advantageously be effected by the field pulse received together with the television signal by the receiver. The one transmitted field pulse contained in the identifying signal $U_{Kenn}$, detecting by gate 40, serves as a starting signal for the data transmission cycle which resets to starting condition the field counter and register 41 and the stores 37a and 37b. The field counter and register 41 has outputs 41a and 41b respectively active during successive fields of the field count cycle for connecting the output of rectifier 26 successively to decoders 27a and 27b by means of the gates of switch 42.

Figure 8:
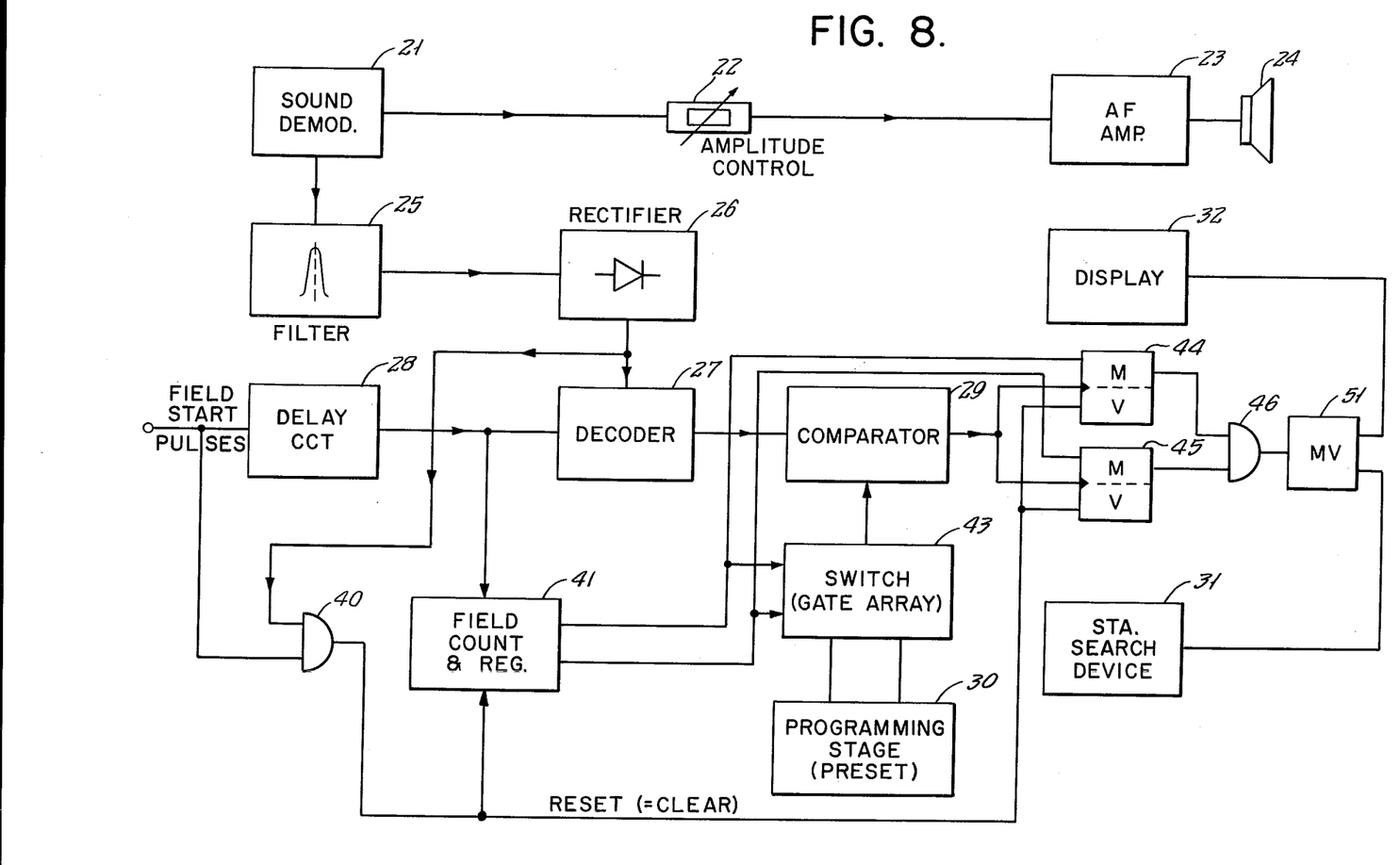
FIG. 8 is a block diagram of another form of modification of the circuit of FIG. 5 for receiving additional information transmitted over a cycle of a plurality of fields.

The stores, however, may be omitted when, as in the circuit of FIG. 8, partial comparisons take place during the picture flyback after each field, and when the results of each partial comparison are stored in simple bistable multivibrators 44 and 45, the output signals of which, being positive upon detection of equality, are fed to an AND-circuit 46, or when the operation, as in FIG. 9, is only stepped on to the next partial comparison in comparator 29b, when the preceding partial comparison in comparator 29a has shown an equality and has caused multivibrator 47 to open the gate 48.

A negative output 49 of multivibrator 47 is also used to block the connection between decoder 27 and comparator 29a by means of gate 50 once equality of the decoder count and the program side input of the comparator 29a has been determined. The picture flyback interval at the end of each field can conveniently be used for the operation of transferring the decoder output (final count in the illustrated case) to the comparator and carrying out consequent switching operations if the comparator finds an equality condition. The circuits necessary for such timing of comparator operation are well understood and are left out of the drawings to simplify the illustration of the invention. In the circuit of FIG. 8, the enabling of the display device 32 and the disabling of the station search device 41 is, as mentioned before, performed by the AND circuit 46. The multivibrator 51 simply represents a switch that remains as set by the AND gate, a function assumed to be incorporated either in the comparator 29 or in the devices 31 and 32 in the circuit of FIG. 5. Re-enabling the search device and turning off the display when the received code ceases the match that set by the programming stage 31 can be done by various well-known means for allowing or causing the multivibrator 50 to reset.

Figure 6:
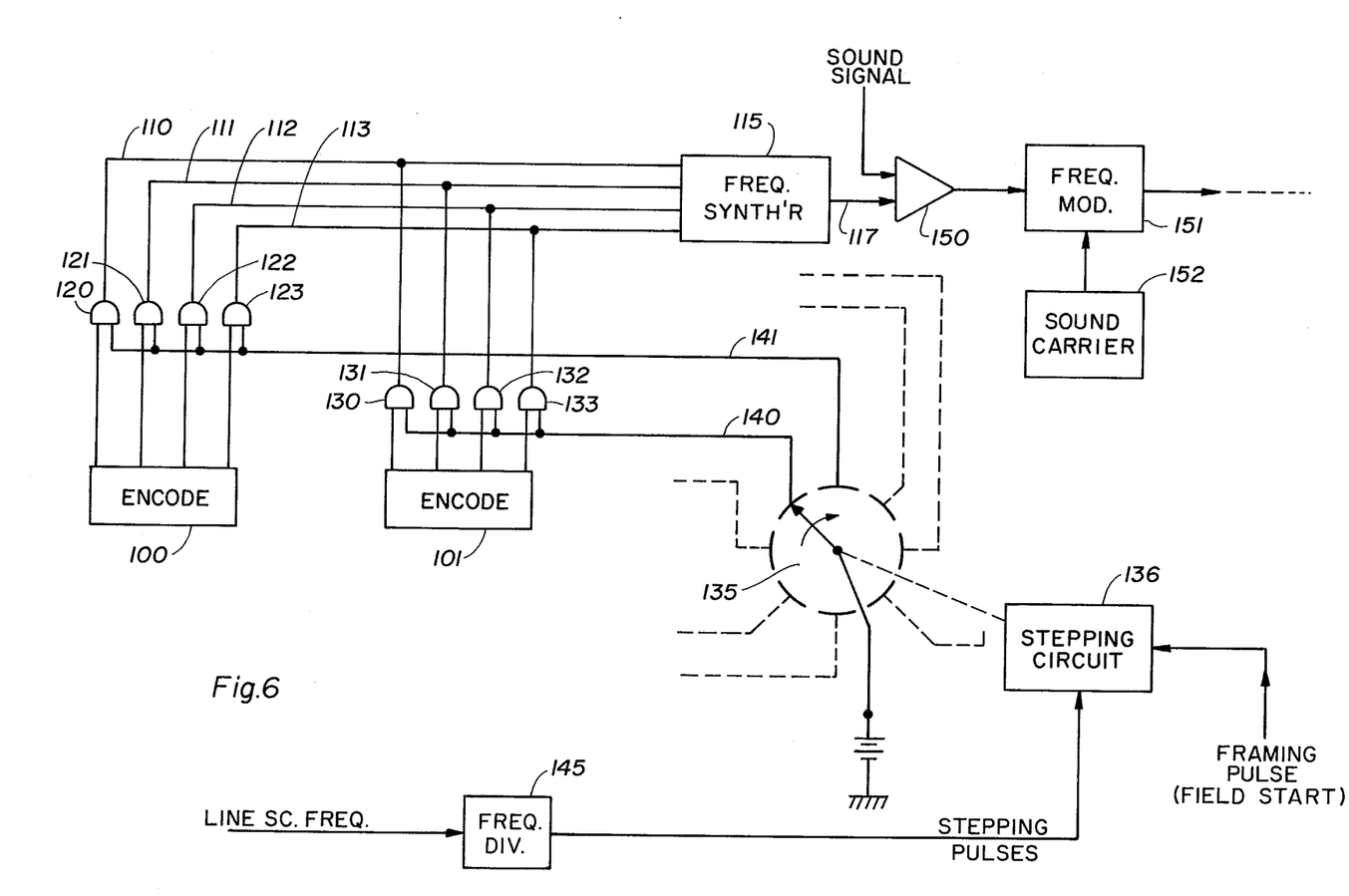
FIG. 6 is a block diagram of another form of circuit for building up an identifying signal.

FIG. 6 shows in block form the diagram of a circuit of another way of modulating the additional information onto the sound carrier of a television signal. In this circuit, the previously mentioned system of utilizing a subcarrier that is unmodulated during the respective time slots into which the television field period can be subdivided but which changes from one unmodulated frequency to another at transitions between time slots is used for encoding the additional information. Encoders 100 and 101 are shown representing encoders for two different time slots of a field period. Normally the field will be subdivided into more than two time slots, but only two of the encoders are shown in FIG. 6 to demonstrate the principle. The time slot period is about 1 millisecond, which is to say that the time slot switching frequency is about 1 kHz, like the frequency of the clock pulse generator 15 in FIG. 2. The actual time slot switching frequency in this case is shown as obtained by division of the line scanning frequency. If a field period is 1/60 second, some 16 time slots per field would be provided. Each encoder is set to provide a combination of binary signals on the control leads 110, 111, 112 and 113 of a frequency synthesizer 115, which determines the output frequency on the lead 117 generated by the frequency synthesizer. Of course, there may be more or fewer frequency control leads than those shown in FIG. 6, four being shown just for illustrative purposes. The encoders 100 and 101 are each connected to the control leads 110, 111, 112 and 113 through AND-gate arrays, in the case of encoder 100 the AND-gate array 120, 121, 122 and 123 and in case of the encoder 101 the array 130, 131, 132 and 133. The other encoders for the other time slots that are not shown are, likewise, connected to the control leads of the frequency synthesizer by gate arrays, not shown. The gate arrays are switched on in cyclic sequence by a stepping switch 135 controlled by a stepping circuit 136 so as to provide pulses opening the AND-gate arrays in turn. These pulses are furnished to the AND-gate arrays 120, etc. and 130, etc., respectively through the leads 140 and 141. The stepping circuit is advanced from one AND-gate array to the next by stepping pulses derived through a frequency divider 145 to which the line scanning frequency is furnished, in order to produce stepping pulses at a frequency which is a predetermined fraction of the line scanning frequency. In order that the stepping circuit may always begin its cycle at the beginning of a television field period, it is provided with a framing pulse derived from a television field start pulse generated elsewhere in the television transmitter.

The frequency synthesizer output is added to the sound signal in a summing amplifier 150, which may be an operational amplifier, and the output of the summing amplifier 150 is then supplied to the frequency modulator 151 which modulates the sound carrier supply from the oscillator 152. The modulated sound carrier, of course, is then combined with the modulated picture carrier in the usual way to produce a composite television signal.

As illustrated in FIG. 6, the entire digital signal cycle is provided in a single television field period, but of course, it is evident that in alternate field periods a different cycle of signals could be provided, in which case the period and number of time slots would be such as to extend over several fields, and, of course, the field start pulses could be counted down to provide the framing pulse.

The receiving circuit for the type of signal buildup illustrated in FIG. 6 would essentially be the inverse of the FIG. 6 block diagram, which is to say that the modulated sound carrier would go to a frequency demodulator and a filter would strip the subcarrier from the sound signal, after which the subcarrier frequency would be demodulated and then switched to separate time slot receivers by a stepping switch (or if desired, first switched and then demodulated in each time slot circuit to operate decoding circuits).

Thus, the present invention offers a method, the realization of which requires only little expenditure, especially as regards the receiver, and especially for the preferred mode illustrated in FIGS. 1–5, and, therefore, seems suitable for general application.

Although the invention has been described with reference to particular illustrative examples, variations are possible within the inventive concept. Thus, the receiver may simply add the pulses received in two or three successive fields before decoding, which is an economical arrangement, utilizing the field pulse on the subcarrier as a framing pulse, or by use of circuits like those of FIG. 2, the pulses received in each field interval may be separately decoded in order to increase the variety of information receivable. Furthermore, although the stepping switch 135, 136 is illustrated as if it were an electric mechanical switch, it will be understood that it is normally provided by an equivalent switching circuit utilizing an array of semiconductor switching devices.

We claim:

1. Apparatus for transmitting coded additional information in a television signal comprising:
   means for generating electric sub-carrier waves;
   means for modulating said sub-carrier waves to produce trains of pulses of said sub-carrier waves according to a code comprising:
      means responsive to television field start pulses including a delay circuit and a pulse sequence generator for producing a sequence of counting pulses beginning after the lapse of a predetermined delay following generation of a television field start pulse;

a plurality of counting circuits arranged to receive sequences of counting pulses from said pulse sequence generator;

a plurality of encoding means connected respectively to said counting circuits for determining the end of count timing for each of said counting circuits in accordance with said additional information, and logic circuit means responsive to television field start pulses and to the end of count timing outputs of said counting circuits and to the output of said pulse sequence generator for producing as an output a train of pulses corresponding in number to the output of one of said encoding means during one television field interval, and to the output of another of said encoding means during the next television field interval and so until pulse trains corresponding to the output of each encoding means have been produced, and for thereafter repeating the producing of said pulse trains, and means for modulating the sound carrier of a television signal with the output of said means for modulating said sub-carrier waves, the sub-carrier frequency of said sub-carrier waves always being such that upon demodulation of the television sound carrier said sub-carrier frequency will lie above the audible range.

2. Apparatus for receiving coded additional information in a television signal, in a television receiver having a sound demodulator (21), comprising, in combination:

a narrow band filter (25) tuned to an additional information sub-carrier of a frequency lying above the audible range, said narrow band filter (25) being connected to the output of the sound demodulator (21) of said television receiver;

rectifying and decoding means (26, 27) for producing trains of pulses from the modulation of said sub-carrier waves;

means (40) for detecting separately from said pulse trains a recognition signal start pulse whenever a pulse of said sub-carrier waves corresponding in time to a television field start pulse is provided in the output of said narrow band filter (25), and means (29a, 29b) for comparing the pulse trains produced by said decoding means (27) in each television field with a predetermined partial digital signal and means (47, 48) responsive to an output of said comparing means representative of a match of a first of said pulse trains and one said partial digital signal for producing a switching operation for enabling a comparison with a different partial digital signal during the next interval.

3. Apparatus as defined in claim 2, including also second means (49, 50) responsive to an output of said comparing means (29a) representative of a match of a first of said pulse trains and one said partial digital signal for effecting a switching process for discontinuing the comparison of said pulse trains with said one partial digital signal until the beginning of a new transmission interval determined in response to said means (40) for separately detecting a recognition start pulse.

4. Apparatus for receiving coded additional information in a television signal, in a television receiver having a sound demodulator (21) and having also means for maintaining the television receiver in a standby condition in which no picture or sound is reproduced by the television receiver and including also an automatic station searching device (31) for uninterruptedly searching the ranges of reception of the receiver when the receiver is in a standby condition, comprising, in combination:

a narrow band receiver (25) tuned to an additional information sub-carrier of a frequency lying above the audible range, said narrow band filter (25) being connected to the output of the sound demodulator (21) of said television receiver;

rectifying and decoding means (26, 27) for producing trains of pulses from the modulation of said sub-carrier waves;

means (29) for comparing the pulse trains produced by said decoding means (27) with a predetermined digital signal for initiating a switching process upon detecting a match of a pulse train provided by said decoding means with said predetermined digital signal, and means for turning the receiver from a standby state into sound and picture reproducing condition when said comparing means (29) responds to said decoding means (27) in consequence of the detection of information transmitted with a television signal corresponding to said predetermined digital signal.

5. Apparatus as defined in claim 4, in which there are also provided means (40) for detecting separately from said pulse trains a recognition signal start pulse whenever a pulse of said sub-carrier waves corresponding in time to a television start pulse is provided in the output of said narrow band filter (25), and in which said rectifier and decoding means comprise a plurality of decoders (27a, 27b), and in which, further, means (41, 42) are also provided for providing an output derived from the output of said narrow band filter (25) to each of said decoders in succession in successive television field intervals beginning and ending with an output pulse from said means (40) for detecting a recognition signal start pulse, and in which said comparing means (29) constitute means for comparing the pulse trains produced by each of said decoders (27a, 27b) with respective portions of said predetermined digital signal.

6. Apparatus for receiving coded additional information in a television signal, in a television receiver having a sound demodulator (21), comprising, in combination:

a narrow band filter (25) tuned to an additional information sub-carrier of a frequency lying above the audible range, said narrow band filter (25) being connected to the output of the sound demodulator (21) of said television receiver;

rectifying and decoding means (26, 27) for producing trains of pulses from the modulation of said sub-carrier waves;

means (40) for detecting separately from said pulse trains a recognition signal start pulse whenever a pulse of said sub-carrier waves corresponding in time to a television start pulse is provided in the output of said narrow band filter (25);

means (29) for comparing the pulse trains produced by said decoding means (27) with respectively different portions of a predetermined digital signal, including means (41, 43) for successively providing different portions of said predetermined digital signal to said comparing means in successive television field intervals of a cycle of field intervals beginning and ending with an output of said means (40) for detecting a recognition signal start pulse, and means (44, 45, 46) for storing the results of said comparison by said comparing means represented by the output of said comparator in successive television field intervals and for initiating a switching process in said receiver upon detection in said comparing means of a match of each pulse train provided by said decoding means with the corresponding portion of said predetermined digital signal.

* * * * *